US010536708B2

(12) United States Patent
Mandapadi Ramasubramanian et al.

(10) Patent No.: US 10,536,708 B2
(45) Date of Patent: Jan. 14, 2020

(54) EFFICIENT FRAME LOSS RECOVERY AND RECONSTRUCTION IN DYADIC HIERARCHY BASED CODING

(71) Applicant: INTEL CORPORATION, Santa Clara, CA (US)

(72) Inventors: Prasanna Kumar Mandapadi Ramasubramanian, Hillsboro, OR (US); Rajesh Poornachandran, Portland, OR (US); Sri Ranjan Srikantam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 15/712,058

(22) Filed: Sep. 21, 2017

(65) Prior Publication Data

US 2019/0089966 A1    Mar. 21, 2019

(51) Int. Cl.
| | |
|---|---|
| *H04N 19/70* | (2014.01) |
| *H04N 19/169* | (2014.01) |
| *H04N 19/31* | (2014.01) |
| *H04N 19/109* | (2014.01) |
| *H04N 19/114* | (2014.01) |
| *H04N 19/65* | (2014.01) |
| *H04N 19/895* | (2014.01) |

(52) U.S. Cl.
CPC ......... *H04N 19/188* (2014.11); *H04N 19/109* (2014.11); *H04N 19/114* (2014.11); *H04N 19/31* (2014.11); *H04N 19/65* (2014.11); *H04N 19/70* (2014.11); *H04N 19/895* (2014.11)

(58) Field of Classification Search
CPC .. H04N 19/188; H04N 19/114; H04N 19/109; H04N 19/70; H04N 19/31
USPC ..................................... 375/240.12
See application file for complete search history.

(56) References Cited

U.S. PATENT DOCUMENTS

| | | | | |
|---|---|---|---|---|
| 8,612,498 | B2 * | 12/2013 | Walker | H04N 21/23439 375/240 |
| 10,244,257 | B2 * | 3/2019 | Hannuksela | H04N 19/597 |
| 2011/0142138 | A1 * | 6/2011 | Tian | H04N 19/597 375/240.24 |
| 2013/0208792 | A1 * | 8/2013 | He | H04N 19/105 375/240.12 |
| 2013/0235152 | A1 * | 9/2013 | Hannuksela | H04N 19/597 348/43 |

(Continued)

OTHER PUBLICATIONS

Berger et al., "Frame Marking RTP Header Extension," Network Working Group, https://tools.ietf.org/html/draft-ietf-avtext-framemarking-04, Mar. 13, 2017, 11 pages, USA.

(Continued)

*Primary Examiner* — Shan E Elahi
(74) *Attorney, Agent, or Firm* — International IP Law Group, P.L.L.C.

(57) ABSTRACT

A method for efficient frame loss recovery and reconstruction (EFLRR) in a dyadic hierarchy is described herein. The method includes obtaining a current frame of a group of pictures. The method also includes calculating a Dyadic Hierarchy Picture Index difference based on a layer information in response to a prior frame missing in the group of pictures. Finally, the method includes decoding the current frame in response to a determined frame continuity based on the Dyadic Hierarchy Picture Index difference.

25 Claims, 9 Drawing Sheets

(56) References Cited

U.S. PATENT DOCUMENTS

2013/0271565 A1* 10/2013 Chen .................... H04N 19/597
  348/43
2014/0092978 A1* 4/2014 Bugdayci ............... H04N 19/30
  375/240.16

OTHER PUBLICATIONS

Gilman et al., "Session Description Protocol (SDP) Media Capabilities Negotiation," Internet Engineering Task Force, https://tools.ietf.org/html/rfc6871, Feb. 2013, 55 pages, USA.

ITU website, "Recommendations," ITU-T H.264 https://www.itu.int/rec/T-REC-H.264, viewed Aug. 8, 2017, 1 page, Switzerland.

Marpe et al., Hierarchical Prediction Structures, https://www.hhi.fraunhofer.de/en/departments/vca/research-groups/image-video-coding/research-topics/hierarchical-prediction-structures.html, viewed Oct. 11, 2017, 5 pages, Germany.

Mathew, Manu, "Overview of Temporal Scalability with Scalable Video," Texas Instruments, http://www.ti.com/lit/an/sprabg3/sprabg3.pdf, Application Report SPRABG3, Nov. 2010, 8 pages, USA.

Ott et al., Extended RTP Profile for RTCP based RTP/AVPF Network Working Group, https://tools.ietf.org/html/rfc4585#section-6.3.1, Jul. 2006, 51 pages, USA.

Singer et al., "A General Mechanism for RTP Header Extensions," Network Working Group, https://tools.ietf.org/html/rfc5285, Jul. 2008, 17 pages, USA.

Wang et al., "RTP Payload Format for H.264 Video," Internet Engineering Task Force, https://tools.ietf.org/html/rfc6184, May 2011, 101 pages, USA.

Wenger et al., "Codec Control message for RTP AVPF", Network Working Group, https://tools.ietf.org/html/rfc5104#section-4.3.1, Feb. 2008, 64 pages, USA.

Wenger et al., "RTP Payload Format for Scalable Video Coding," Internet Engineering Task Force, https://tools.ietf.org/html/rfc6190, May 2011, 100 pages, USA.

* cited by examiner

600

EFFICIENT FRAME LOSS RECOVERY AND RECONSTRUCTION IN DYADIC HIERARCHY BASED CODING

BACKGROUND ART

Video streams may be encoded in order to reduce the image redundancy contained in the video streams. An encoder may compress frames of the video streams so that more information can be sent over a given bandwidth or saved in a given file size. The compressed frames may be transmitted to a receiver or video decoder that may decode or decompress the frames for rendering on a display. In some cases, video compression is done by temporal scalability, where the current frame is encoded by finding similar content on a prior frame according to a hierarchical structure.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
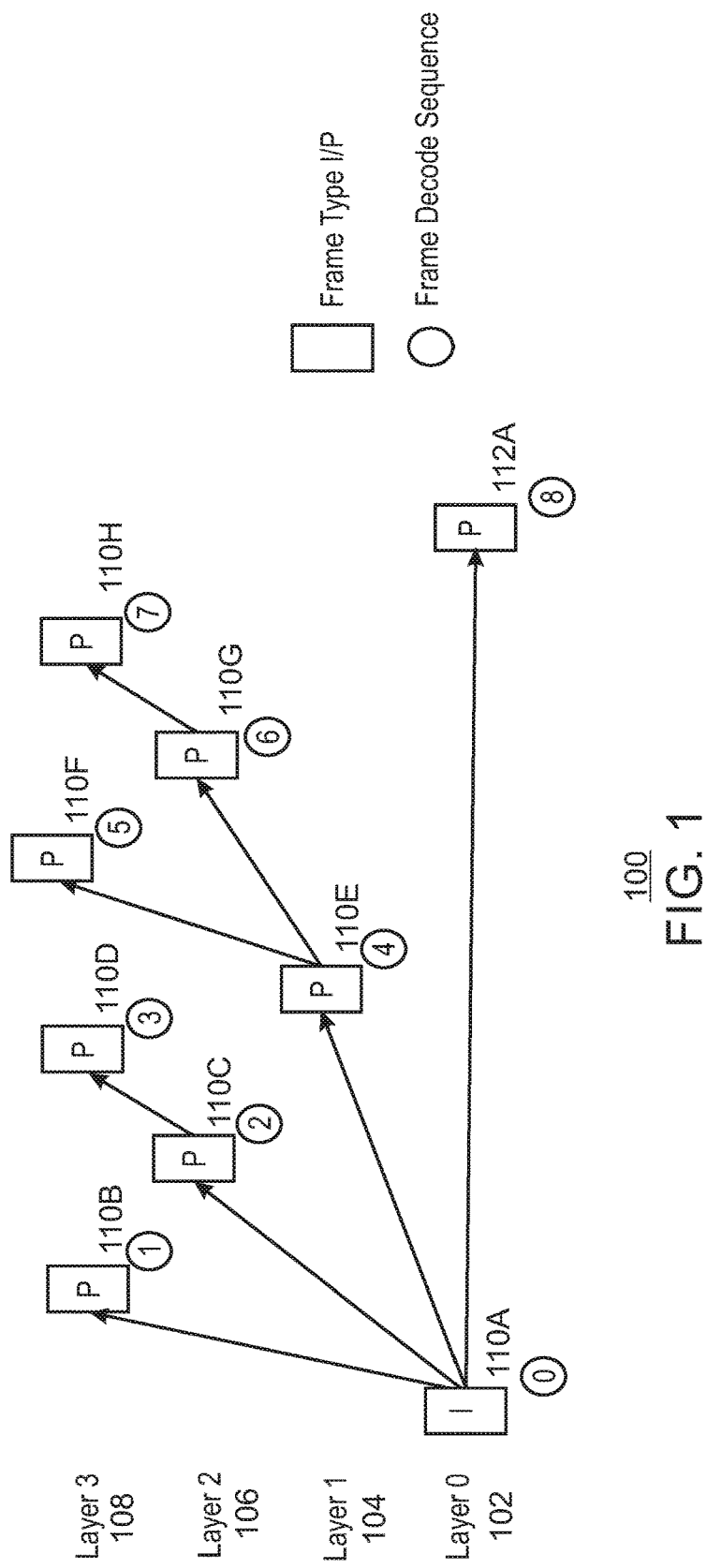
FIG. 1 is an illustration of a group of pictures (GOP)

With temporal scalability, the frame rate of an encoded bit stream may be reduced by dropping packets, thereby reducing the bit rate of the encoded bit stream via frame thinning. Temporal scalability utilizes a hierarchy structure to establish a dependencies between frames of different layers. The layers that enable scalability may include a base layer and one or more enhancement layers. The base layer of a bit stream is coded in compliance with a non-scalable profile of the coding specification, such as H.264/AVC. This is referred to as single-layer coding. The enhancement layers may be encoded based on any previous layers, which may include the base layer, resulting in scalable video coding (SVC). Each layer may be characterized by its own bit rate and visual quality.

For ease of description, the present techniques are described using H.264/AVC as an exemplary video coding standard. However, various video standards may be used according to the present techniques. Exemplary standards include the H.264/MPEG-4 Advanced Video Coding (AVC) standard developed by the ITU-T Video Coding Experts Group (VCEG) with the ISO/IEC JTC1 Moving Picture Experts Group (MPEG), first completed in May 2003 with several revisions and extensions added to date. Another exemplary standard is the High Efficiency Video Coding (HEVC) standard developed by the same organizations with the second version completed and approved in 2014 and published in early 2015. A third exemplary standard is the VP9 standard, initially released on Dec. 13, 2012 by Google.

While temporal scalability is often implemented to realize bandwidth adaptation by performing frame thinning (i.e. controlling the frame rate) at the sender, the dyadic hierarchy structure of temporal scalability can be used at the receiver to derive which frames can be decoded when frames are lost. A dyadic hierarchy structure indicates the received frames may not have a linear dependency, and instead depend on other frames in a dyadic fashion. Packet loss and the resulting frame loss is often inevitable due to varying network conditions. In such scenarios, only frames that are decodable are able to be sent for decode. In embodiments, frames are decodable when the decoder has received all the previous frames referenced by the frame that is to be decoded, sometimes referred to as the current frame. When the previous frames referenced by the frame that is to be decoded are incomplete, the decoder stack cannot decode the current frame properly, leading to unacceptable visual artifacts with a poor user experience. Hence incomplete frames are dropped and not sent for decode.

Embodiments of the present techniques enable efficient frame loss recovery and reconstruction in dyadic hierarchy based coding. In examples, the efficient frame loss recovery and reconstruction in dyadic hierarchy based coding may occur during video conferencing. Even when frames are lost, the present techniques can identify reliably whether or not a current frame can be decoded by determining if the previous frames which it references have been properly received at the decoder. Based on this determination, decoding the current frame can continue without requesting a new key frame or any other retransmissions. As used herein, key frames may be frames from a video stream that are fully specified. In particular, key frames contain an entire image and are coded without reference to any other frames. These fully specified frames may be used to predict other frames of the video stream.

The traditional techniques may lead to a bad user experience due to short video freezes (caused by non-availability of sufficient info to create the dependency relationship and continue decode with other possible received frames). Further, a higher network utilization may occur due to retransmission of frames or dynamic Instantaneous Decoding Refresh (IDR) request after timeout. Moreover, a high latency may occur due to delay in continuing the playback.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is an illustration of a group of pictures (GOP) 100. The GOP 100 includes eight frames 110 that may be in a hierarchy coding structure, such as a Dyadic Hierarchy P structure with a coding order of minimum decoding delay. In the example of FIG. 1, the GOP 100 is in a hierarchical prediction structure with four dyadic hierarchy layers 102, 104, 106, and 108. The GOP 100 includes frames 110A, 110B, 110C, 110D, 110E, 110F, 110G, and 110H. Frame 112A indicates the start of a next Hierarchical P structure GOP.

Each of the frames 110 or 112 may belong to a hierarchy layer. For example, a base layer 0 102 includes frames 110A and 112A. The base layer 0 102 frames may not depend on any higher layers (104, 106 or 108). Frames may be specified during compression using intra-coded frames (I-frames), predicted picture frames (P-frames) and bi-directional predicted picture frames (B-frames). As used herein, specified refers to the data that is saved for each frame during compression. An I-frame is fully specified. In embodiments, a key or reference frame is an I-frame that is fully specified. A P-frame is specified by saving the changes that occur in each frame when compared to the previous frame, while a B-frame is specified by saving the changes that occur in each frame when compared to both the previous frame and the subsequent frame. Thus, P- and B-frames have dependencies on other frames.

As illustrated in FIG. 1, frame 110E may belong to layer 1 104. Frames 110C and 110G may belong to layer 2 106. Finally, frames 110B, 110D, 110F, and 110H belong to layer 3 108. For ease of description, frames 110B, 110C, 110D, 110E, 110F, 110G, 110H, and 112A may be P-frames, such that each frame is dependent on a preceding frame. However, the present techniques may be applied to any combination of P-frames or B-frames. The dyadic hierarchy illustrated by the GOP 100 of FIG. 1 constructs each frame with different levels of dependency. The present techniques derive layer continuity information from the available dyadic hierarchy information. If certain frames are lost, subsequent frames can still be decoded when their dependency is intact. Frames may be lost to, for example, inadequate network connections.

Thus, the dyadic hierarchy provides information that enables decoding even when frames are lost. For example, in FIG. 1, even if frame '1' 110B was lost, frame '2' 110C may be decoded based on its dependency on frame '0' 110A. Similarly, even if frame '5' 110F is lost, frame '6' 110G may still be decoded without a request for additional frames. In other words, subsequent frames can be decoded as long as their dependencies remain intact.

Coding standards often enable access to various details about each frame as it is encoded. Each frame may comprise one or more slices, where each slice is an independently decodable piece of the frame. The encoding of a slice generates an encoded representation of the slice comprising a slice header and slice data. The encoded presentation is output from the encoding process as a so called Network Adaptation Layer unit (NALU). The NALU may include a header that indicates the type of data contained within the NALU. The remaining part of the NALU contains payload data in the form of slice data, which may be media data or content associated with the slice. The NALU may then be combined with headers to form a data packet to be transmitted as a part of a bit stream from the encoder to the decoder. The header may be, for example, according to the Real-time Transport Protocol (RTP).

Thus, the encoded stream of video data may comprise a series of network abstraction layer units (NALUs). NALU headers of each NALU with temporal scalability extensions may include different sets of syntax elements in addition to those defined by the H.264/AVC standard. For example, H.264/AVC defines prefix NALUs which will be part of the encoded frames. The prefix NALU describes elements such as idr_flag, temporal_id, priority_id, and the like. In embodiments, the prefix NALU is a NALU that sits before the H.264/AVC NALU and is introduced to convey the layer indexes. These elements can be helpful in determining information about the current frame, such as like whether the current frame is an IDR or key frame, its layer information, and the priority of the frame. The idr_flag element indicates if the NALU of the current header is an IDR NALU. The temporal_id element may indicate a temporal level of the NALU. In embodiments, the temporal level may indicate a frame rate associated with the NALU. Finally, the priority_id element may indicate a priority of the NALU.

The information typically provided according to traditional coding standards, even with a temporal scalability extension, does not provide enough detail to identify the continuity/dependency between the frames. As a result, some frames cannot be reconstructed when the frames on which they depend are lost. Frame dependency, as used herein, is information that conveys which frames are coded based on information from another frame. Frame dependency may indicate the reference structure map of the frames in the GOP. Frame continuity is determined using the frame dependency. A frame is continuous if all of its reference frames are available. Identifying the dependent frames is often not possible at the network receiving layer without parsing the slice headers. Further, parsing the codec headers to identify this information will lead to a large amount of overhead due to the additional computation at the receiver. This overhead can cause further delays which will impact the device power and performance.

In some solutions, a sequence number, marker bit, and time stamp available in a Real-time Transport Protocol (RTP) header may be used to determine frame dependency and continuity. The use of RTP header information may suit a linear frame sequence as all frames will be dependent and continuous with previous frames. However, the frame dependency cannot be reconstructed for all the temporal layers in case of packet/frame loss. Other solutions enable frame dependency reconstruction by using a Temporal Layer 0 Picture Index (TL0PICIDX), which is a running index of base temporal layer 0 frames. For higher layers, this indicates a dependency on the given index. This TL0PICIDX solution focuses mainly on the base layer (layer 0) and can be used to identify frames in base layer and immediate next layer (layer 1) only. However, such a solution lacks the information to reliably reconstruct the dependency of higher layers.

These traditional solutions do not address how to reconstruct the dependency of frames for all the layers in a dyadic hierarchy without parsing the slice header of the frames. In particular, the frame dependency in any layer cannot be reconstructed using standard fields in RTP header and prefix NALU headers when there is packet loss. This leads to a poor user experience as the next GOP (or new IDR in case of AVC) is used to continue decoding, resulting in delays in decode/rendering processes thereby causing video freezes. Moreover, requesting a dynamic IDR frame (key frame) will also cause delay as decoding will wait until the new IDR frame is received. In addition, the request of a dynamic IDR frame will increase the network load as well since IDR frames consume a higher bitrate when compared to other frames.

Further, the use of a TL0PICIDX index does not address the frame reconstruction for higher layer frames, such as those greater than layer 1. In a hierarchy coding structure, the number of frames will typically increase in the higher layers as captured in 'Table 1' below. In particular, 'Table 1' illustrates the distribution of frames in each layer with a three layer hierarchy coding structure and a four layer hierarchy coding structure. The higher layers most often include a higher number of frames when compared to the lower layers. Hence, it is not ideal to skip/ignore the higher layer frames during the frame reconstruction in bad network conditions (with packet loss or high transit delays). Skipping or ignoring higher layer frames can lead to a reduced frame rate (which negatively impacts video smoothness) and can cause short video freezes.

TABLE 1

| | Layer | '3' Layer hierarchy GOP Size: 4 | '4' Layer hierarchy GOP Size: 8 |
|---|---|---|---|
| Distribution of frames in each layer | 0 (base) | 25% | 12.5% |
| | 1 | 25% | 12.5% |
| | 2 | 50% | 25% |
| | 3 | | 50% |

The higher layer frames may also consume lower bandwidth, as they are most often coded using dependencies on other frames. As a result, the probability of receiving the higher layer frames in bad network conditions is very high due to the lower bandwidth consumption by those higher layer frames. The present techniques ensure that these frames are processed whenever their dependent frames are received instead of dropping them due to lack of the ability to reconstruct the frame continuity.

Thus, the present techniques enable a robust and reliable manner to reconstruct the frame dependency for all layers using a Dyadic Hierarchy Picture Index (DHPIDX). In an embodiment, the DHPIDX is a running counter for all encoded frames. The receiver can use the DHPIDX to determine if a current frame is decodable and that all of the frames upon which the current frame depends are available, or if it is not decodable because a frame upon which it depends was not received.

In embodiments, a transmitter may generate and share the DHPIDX information for each encoded transmitted frame. The receiver is to leverage the DHPIDX and determine if a frame is decodable or not, even when some frames are lost. The present techniques can be used to reliably reconstruct the frame dependency in any layer using the DHPIDX which, in embodiments, is transmitted in-band. The present techniques enable a better user experience as they improve smoothness of the rendered video by reducing the likelihood of freezes or stalls in video playback due to optimal utilization of the received frames. In embodiments, improved video smoothness is a result of a better frame rate even in a congested network as fewer retransmissions of frames occur. Moreover, the network bandwidth utilization is also reduced as the retransmission of packets using a negative acknowledgement (NACK) command or a dynamic IDR is not requested unless necessary as described below.

Further, according to the present techniques the decoder will not be starved without frames for long periods of time, as at least the few decodable higher layer frames (which is usually the case as they consume less bandwidth) can be received, thereby minimizing the frame transmission requests. In a congested network with a high round trip time (RTT), there will be high delays to receive retransmitted frames. Due to this high RTT, the receiver may have an internal timeout and request dynamic IDR as a result of the timeout. This request will again load the network further. Lower latency may be enabled according to the present techniques as decoding can continue with the frames received if they are decodable instead of waiting for all the frames based on sequence numbers. This reduces the delay in feeding the frames to decoder thereby minimizing the rendering delay and latency. Further, there is no additional performance overhead to parse the slice header to identify the frame dependency. Battery efficiency is also improved by lowering retransmission requests to the transmitter and the reprocessing of frames in receiver end. Efficient battery use may be useful in resource constrained mobile client platforms with increasing video content consumption.

Figure 2A:
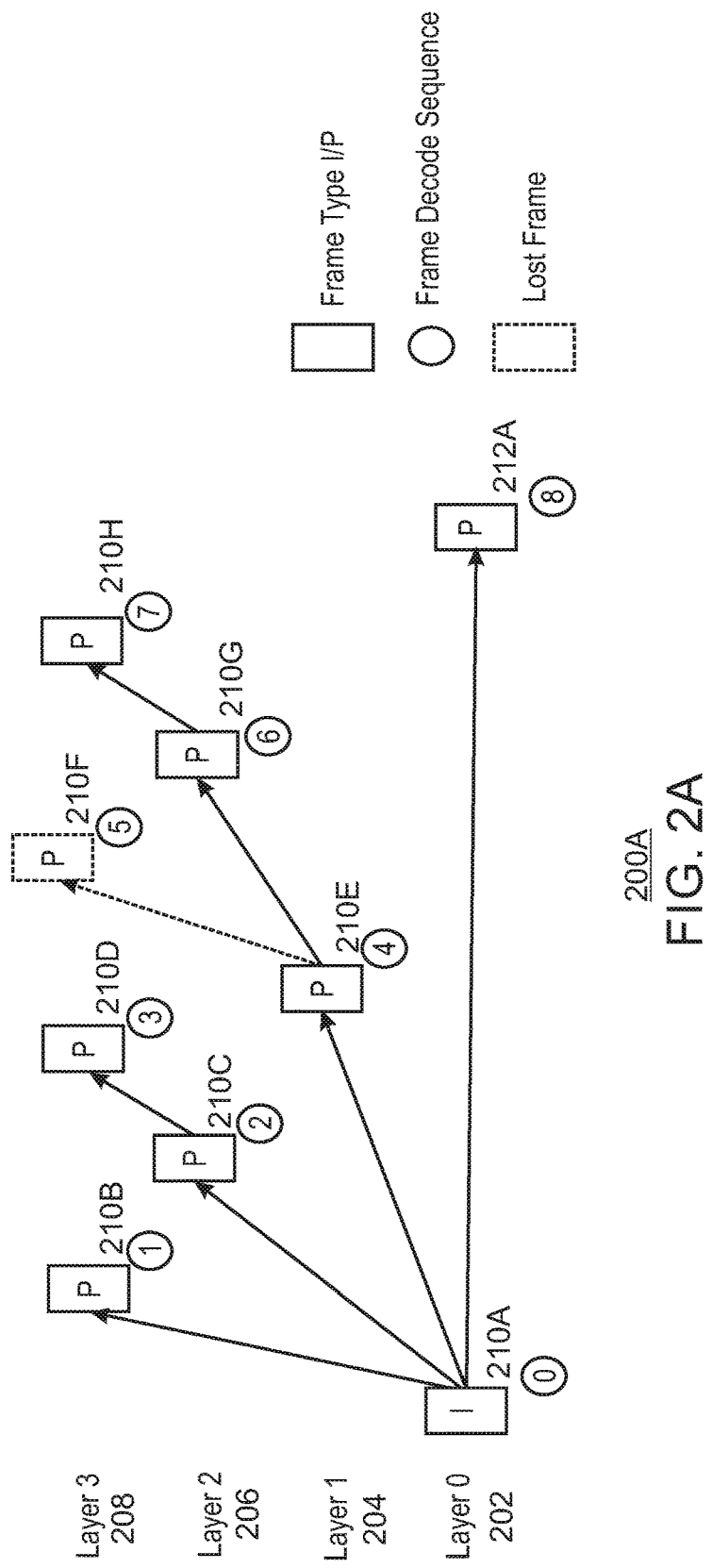
FIG. 2A is an illustration of a GOP.

FIG. 2A is an illustration of a group of pictures (GOP) 200A. Similar to FIG. 1, the GOP 200A includes eight frames 210 that may be in a hierarchical prediction structure with four dyadic hierarchy layers 202, 204, 206, and 208. The GOP 200A includes frames 210A, 210B, 210C, 210D, 210E, 210F, 210G, and 210H. Frame 212A may indicate the start of a next Hierarchical P structure GOP.

In FIG. 2A, dashed lines indicate a lost frame. Thus, in the example of FIG. 2A, frame '5' 210F is lost during transmission. The frame '5' 210F may be lost for a number of reasons, including frame thinning and network transmission errors. With existing solutions, only frame '1' 110B, frame '2' 110C, frame '3' 110D, and frame '4' 110E are able to be decoded in the event of a loss of frame '5' 110F. Thus, traditional solutions drop frame '6' 110G and frame '7' 110H even though they are decodable as being dependent on frame '4' 110E. Dropping frame '6' 110G and frame '7' 110H, though they are decodable as being dependent on frame '4' 110E, may lead to a poor use experience. Further, if more frames are not recovered, the loss of a frame can result in frequent frame retransmission or IDR requests, which can consume additional bandwidth.

Figure 2B:
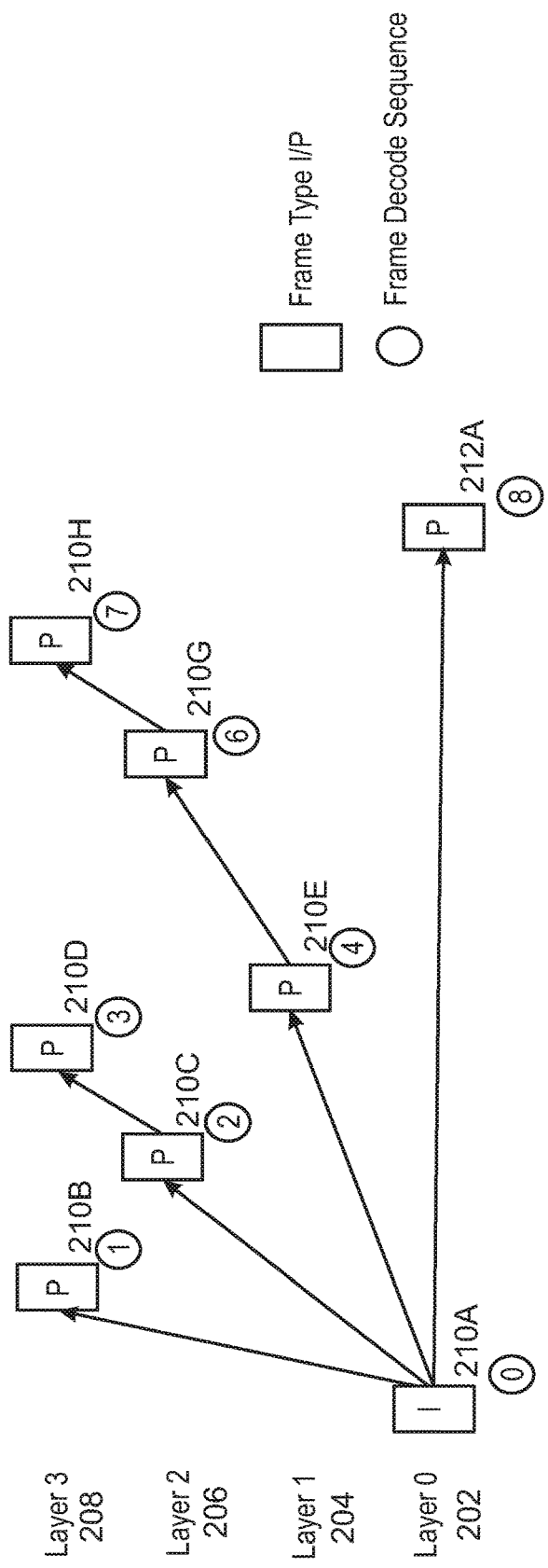
FIG. 2B is an illustration of a GOP with a dropped frame.

FIG. 2B is an illustration of a group of pictures (GOP) 200B with a dropped frame. The GOP 200B includes seven frames 210 that may be in a hierarchical prediction structure with four dyadic hierarchy layers 202, 204, 206, and 208. The GOP 200A includes frames 210A, 210B, 210C, 210D, 210E, 210G, and 210H. Frame 212A may indicate the start of a next hierarchical P structure GOP. The present techniques can be used to identify frame dependencies and proceed with decoding of frames '6' 210G and '7' 210H based on the identified frame dependencies. Thus, frames '6' 210G and '7' 210H can be recovered according to the present techniques. The present techniques result in a better user experience without consuming additional network bandwidth.

Figure 3:
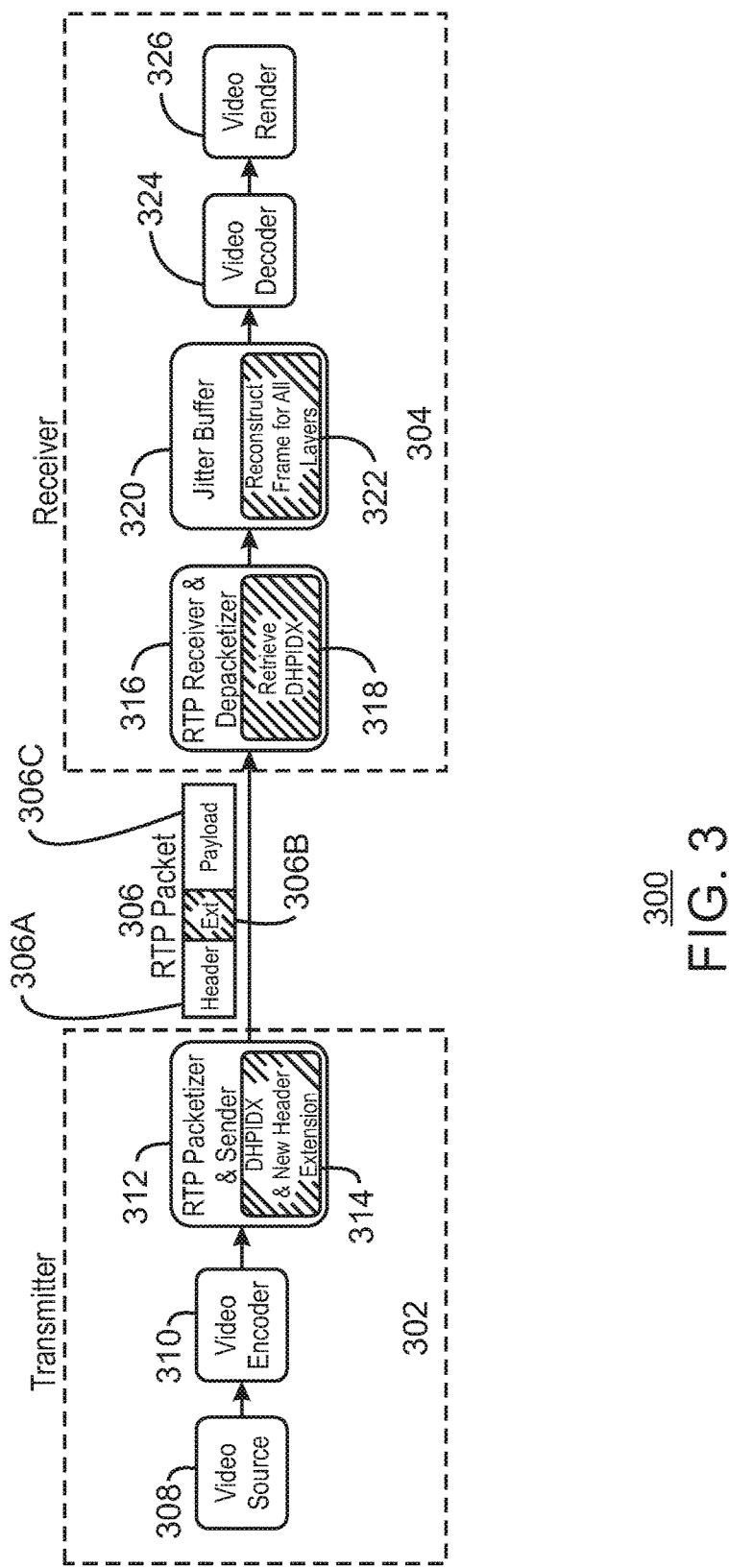
FIG. 3 is a block diagram of a system for efficient frame loss recovery and reconstruction (EFLRR) in dyadic hierarchy.

FIG. 3 is a block diagram of a system 300 for efficient frame loss recovery and reconstruction (EFLRR) in dyadic hierarchy. The system 300 includes a transmitter 302 and a receiver 304. In embodiments, for real time communication an RTP protocol is used to transmit the packets between any video producer to any video consumer. In FIG. 3, the video producer is the transmitter 302, while the receiver 304 is the video consumer. An RTP packet 306 is transmitted from the transmitter 302 to the receiver 304.

A video source 308 is responsible for capturing raw video data. The raw video data may be obtained from an image capture mechanism such as a camera or any other video capture mode or device. The uncompressed raw video is fed to a video encoder 310 to generate encoded video. The encoded video is then packetized at block 312. The packetized video may be appended with a network packet header. In the example of FIG. 3, the packetized video is appended with a network packet header via an RTP packetizer to package the video. The packets 306 are then sent over the network to receiver 304.

At block 314, a Dyadic Hierarchy Picture Index (DHPIDX) may be updated and a new header extension may be applied to the video data prior to transmission across the network. In embodiments, the DHPIDX may be a running counter. The RTP packet 306 includes a header 306A, an extension 306B, and a payload 306C. The extension 306B is custom header extension to transmit the DHPIDX. The receiver 304 includes an RTP receiver and depacketizer 316 to retrieve and unpack the original encoded video. At block 318, the DHPIDX is retrieved. A jitter buffer 320 is a shared memory region used to store the received unpacked packets, collate the information into frames, and then send the collated frames for decode. At block 322, the frames may be reconstructed for all layers based on the DHPIDX retrieved at block 318 and temporal layer details from prefix NALU. The video decoder 324 is used for decoding the video which is later rendered via the desired video output method by the video render block 326.

The present techniques do not depend on video source. Instead, the present techniques are applied when the frames are encoded frames with a hierarchical structure such as dyadic hierarchy. The hierarchical structure can be any hierarchy that enables temporal scalability. The DHPIDX may be transmitted in-band via the RTP header extension at 306B. As used herein, in-band may refer to a data transmission technique that is used to send above mentioned additional data along with the video bit stream. In embodiments, the number of layers supported in the hierarchy coding structure is negotiated between the transmitter 302 and the receiver 304. At the receiver 304, the DHPIDX may be retrieved, and the frame dependency may be reconstructed across all layers of the coding structure.

In embodiments, the RTP packetizer 312 is augmented to include a 2-byte DHPIDX for every frame, which may be generated at block 314 The DHPIDX can start from any number and is incremented for every frame. For example, the DHPIDX may be incremented by '1' for each frame. New frames are identified by the time stamps associated with each frame. In particular, all frames have a separate timestamp usually indicating their capture time/render time. Each timestamp is unique and is used to differentiate/collate the transmitted frames, as each frame is often divided into multiple RTP packets for transmission.

The DHPIDX can rollback once it reaches the maximum limit. In embodiments, the DHPIDX is selected to be 2-bytes instead of 1-byte. This is because maximum value of 1-byte DHPIDX is 255 which will rollback quickly in high frame per second (fps) use cases (120 fps or more). With a 1-byte DHPIDX, the rollback may occur within approximately two seconds. The 2-byte DHPIDX is an exemplary illustration and can be a configurable element according to the present techniques.

In embodiments, the DHPIDX can be transmitted using a one-byte RTP header extension 306B. The one-byte RTP header extension with a two-byte DHPIDX results in an additional 3-bytes being transmitted with the RTP packets 306. The custom RTP header extension can be sent at various intervals. In embodiments, the custom RTP header is implementation specific. For example, the header may be sent once per frame. In other examples, the custom header may be sent with the first and last packets of a frame to minimize the number of additional bytes to be sent. Finally, the header may be sent along with all the packets of a frame.

However, in the case where the particular RTP packet holding the DHPIDX is delayed/lost, a delay may occur until that particular packet is received. Alternatively, the packet with the DHPIDX can be requested via a NACK. In embodiments, incomplete frames are dropped, discarded, or prevented from use in any further processing. In particular, the frame may be designated as an incomplete frame since all packets comprising data for the frame are not received. For complete frames, the DHPIDX will be available as all packets should have been received.

In embodiments, the transmitter and receiver can negotiate the maximum layer (MAX_FRAME_LAYER) supported using the Media-Specific Capability Attribute during the session dependent protocol (SDP) negotiation. This enables identification of the maximum frame layers that are to be supported and transmitted by the encoder. Alternatively, the maximum layers supported can be determined by using the temporal_ID that indicates a temporal layer of the first frame immediately following the base layer frame. As per dyadic hierarchy, this first frame immediately following the base layer frame assigned to the highest layer. Hence this can be used as fallback mechanism to determine the maximum layers supported according to the present techniques. In embodiments, the maximum frame layer value is a number that indicates the particular frame layer level. For example, in a dyadic-4 hierarchy, the levels may be 0, 1, 2, and 3.

Figure 4:
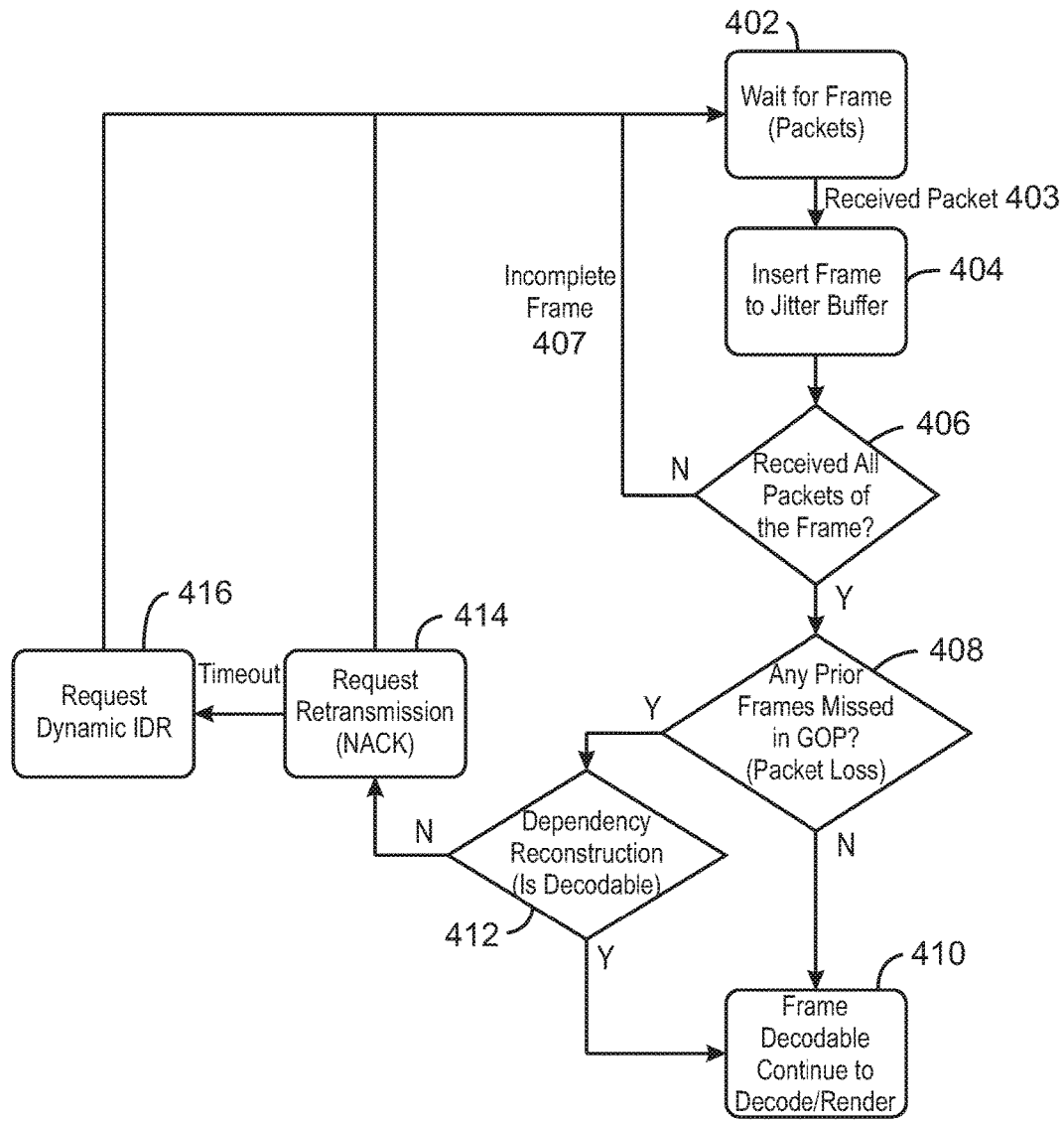
FIG. 4 is a process flow diagram of a method for receiving frames for an efficient frame loss recovery and reconstruction (EFLRR) in dyadic hierarchy.

FIG. 4 is a process flow diagram of a method 400 for receiving frames for an efficient frame loss recovery and reconstruction (EFLRR) in dyadic hierarchy. At block 402, packets of video data are received. The packets of video data may include a portion of a frame as a payload. At block 404, the received packets are stored in the jitter buffer and grouped by their frame time stamp. The completeness of the frame and frame continuity are also checked when each packet is received. At block 406, it is determined if all packets of the frame have been received. If all packets of the frame have not been received, the frame is an incomplete frame 407, and process flow returns to block 402 where additional packets are received. If all packets of a frame have been received, process flow continues to block 408.

At block 408, it is determined if any prior frames are missing in the GOP. In embodiments, any missing frames or packet loss is determined. If it is determined that no frames are missing in a GOP, process flow continues to block 410 where the frames are decodable as all prior frames are present, including dependent frames. At block 410, the frames are decodable and process flow continues to any further decode or render processes.

If it is determined that prior frames are missing in a GOP at block 408, process flow continues to block 412. At block 412, dependency reconstruction is performed. Here, frame decode dependency can be reconstructed with the DHPIDX mechanism described herein. If the frames are decodable based on the DHPIDX mechanism, process flow continues to block 410 where the frames are decodable and process flow continues to any further decode or render processes. If the frames are not decodable based on the DHPIDX mechanism, process flow continues to block 414. At block 414, a retransmission of the missing frames is requested. In embodiments, the retransmission may be requested via a NACK command. If the retransmission is acknowledged within a particular time period, process flow returns to block 402 to wait for the retransmission of the frame or packets of the frame. If the retransmission request results in a timeout, a dynamic IDR frame or key frame is requested at block 416. Process flow then returns to block 402 to wait for the retransmission of the IDR frame.

Thus, in the example of FIG. 4, for each received packet the DHPIDX is retrieved and stored along with frame specific information like sequence number, timestamp, Is IDR, and marker bits. After the complete frame is received, the frame is identified by using the sequence numbers and marker bits. Further, once frame is complete, the continuity can be checked at block 412 to determine if the frame is decodable via the DHPIDX and prefix NALU. Dependency reconstruction is further described with respect to FIG. 5.

With the present techniques, the frame decode dependency may be reconstructed even in network conditions where packet loss occurs. Moreover, the present techniques maximize the received frame utilization as more frames can be decoded based on whether all the required reference frames are available at the decoder. In embodiments, the RTP receiver and depacketizer receive all the packets, parse the RTP header, and retrieve the DHPIDX corresponding to that frame. Note that the slice header is not parsed.

"Table 2" below lists the Dyadic Hierarchy Picture Index difference between the frames of same layer for different configurations:

TABLE 2

| Max Frame Layer | DHPIDX Difference of frames in layer | | | |
|---|---|---|---|---|
| | 0 (base) | 1 | 2 | 3 |
| Linear - 1 | 1 | | | |
| Dyadic - 2 | 2 | 2 | | |
| Dyadic - 3 | 4 | 4 | 2 | |
| Dyadic - 4 | 8 | 8 | 4 | 2 |

The information in Table 2 is useful to know if the received frame is continuous to a given layer. As used herein, layer continuity refers to all frames of a particular layer being present in a GOP. The DHPIDX index difference ($DHPIDX_{DIFF}$) will be used to determine if the received frame is consecutive to and continuous with already cached/received frames in the same layer. In embodiments, the $DHPIDX_{DIFF}$ here indicates the maximum allowed index difference between two frames of the same layer. In general, the $DHPIDX_{DIFF}$ indicates the index difference between any two frames. For example, in FIG. 1 received frame 110D is continuous to 110B in that layer (Layer 3 108) as the difference in the DHPIDX is equal to 2 (when the DHPIDX is implemented by 1 for each frame) which is shown in the table for Dyadic-4 and layer 3. However, this information alone may not be sufficient to reconstruct the frame dependencies for all layers.

Figure 5:
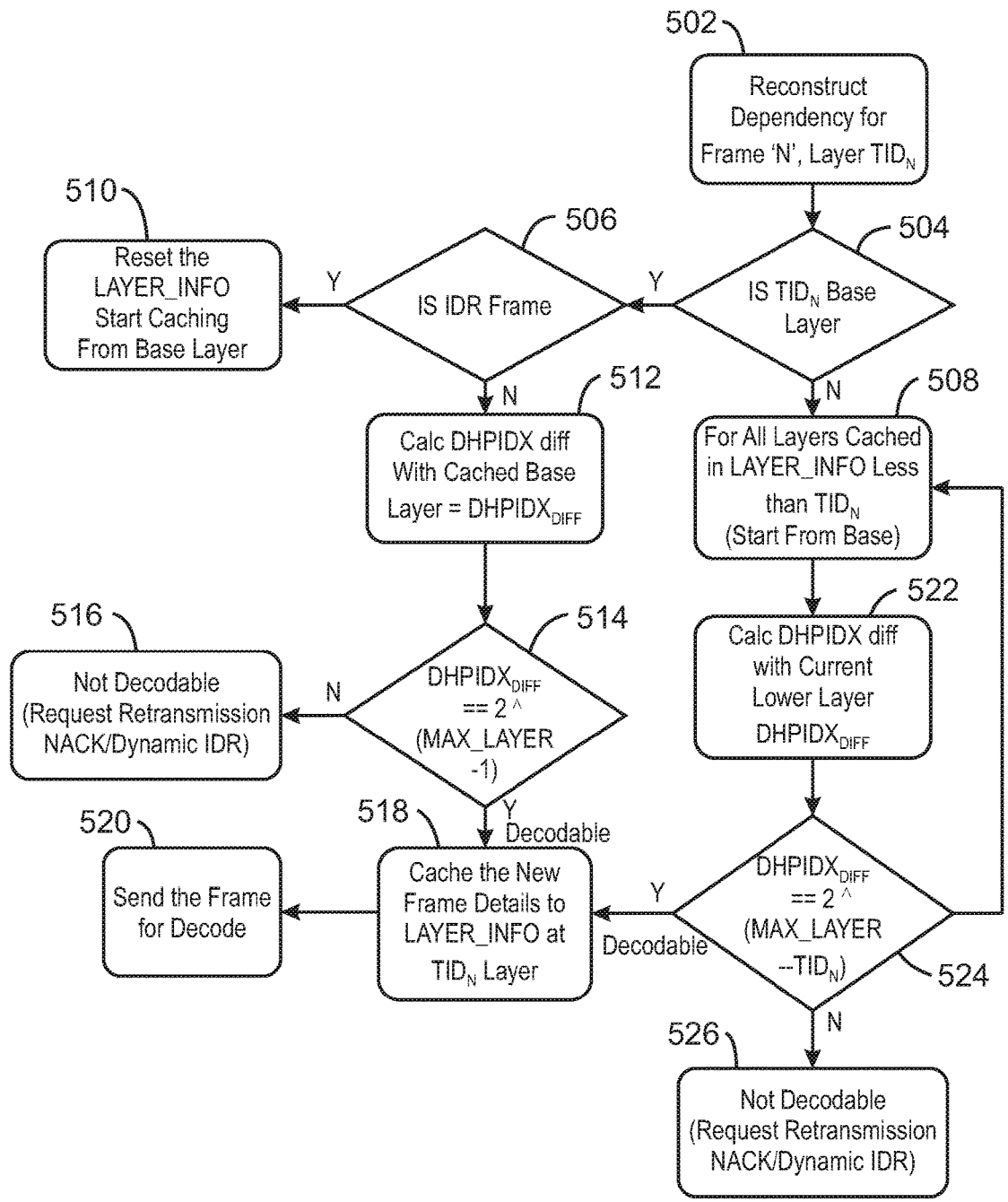
FIG. 5 is a process flow diagram of a method enabling dependency reconstruction.

FIG. 5 is a process flow diagram of a method 500 enabling dependency reconstruction. In order to identify the dependency, additional details are cached. By caching these additional details, certain parameters of the frames that were last decoded at different layers are retained. Thus, when a frame is received, the cached parameters can be used along with new frame information to determine if the received frame is decodable. In embodiments, for each layer, a temporal ID (TID) and Dyadic Hierarchy Picture Index (DHPIDX) are cached to generate a LAYER_INFO structure array of size MAX_FRAME_LAYER. In embodiments, TID is transmitted to the receiver via an SVC header extension such as prefix NALU, which is generated as part of the frame by the encoder (e.g. AVC encoding). The DHPIDX is transmitted to the receiver via an RTP header extension as described above.

When a complete frame is obtained for particular layer, a check is performed to see if the complete frame is decodable. If it is decodable and being passed to decoder, the LAYER_INFO structure is updated for the particular index equivalent to the temporal id of the current frame. Thus, at any given point of time, the LAYER_INFO structure will hold the most recent frame details for the different layers that have been sent for decode.

At block 502, the particular frame N is selected for dependency reconstruction. At block 504, it is determined if the temporal ID of frame N ($TID_N$) identifies a base layer. If it is determined that the $TID_N$ is a base layer, process flow continues to block 506. If it is determined that the $TID_N$ is a not base layer, process flow continues to block 508. At block 506, it is determined if frame N is an IDR frame. If frame N is an IDR frame, process flow continues to block 510. If frame N is not an IDR frame, process flow continues to block 512.

At block 510, a new IDR frame is encountered. The new IDR frame is marked as decodable. Additionally, all the values of the LAYER_INFO are reset since the processing of a new GOP is beginning, where the reception of a new IDR of key frame indicates the beginning of a new GOP. Caching starts again from the base layer. In particular, caching is continued by updating the LAYER_INFO with layer '0' containing IDR frame details.

At block 512, it has been determined that the frame is not an IDR frame, but is instead a base layer frame N. For the subsequent base layer frame N, the $DHPIDX_{DIFF}$ is used against the previous cached base layer frame to identify if it is decodable. Thus, at block 512 the $DHPIDX_{DIFF}$ for frame N (with index '0' as the base layer) is calculated as follows:

$$DHPIDX_{DIFF} = DHPIDX_N - LAYER\_INFO[0] \cdot DHPIDX \qquad \text{Eqn. 1}$$

where the $DHPIDX_{DIFF}$ is equal to the $DHPIDX_N$ for the current frame minus the cached DHPIDX value for the base layer 0 in the LAYER_INFO data structure.

At block 514, it is determined if the frame is decodable. The frame is decodable if the following equation is satisfied:

$$DHPIDX_{DIFF} = 2^{(MAX\_FRAME\_LAYER-1)} \qquad \text{Eqn. 2}$$

where MAX_FRAME_LAYER is the maximum number of layers supported. Here, if the $DHPIDX_{DIFF}$ is equivalent to two to the power of the maximum frame layer supported minus one, the frame is decodable. For example, for a base frame in a dyadic-4 hierarchy, if the $DHPIDX_{DIFF}$ is equal to $2^{(4-1)}=2^3=8$, the frame is decodable as the frames are continuous across the base layer 0.

If the $DHPIDX_{DIFF}$ is found to be not equal to $2^{(MAX\_FRAME\_LAYER-1)}$, the frame is not decodable and process flow continues to block 516. At block 516, retransmission is requested via a NACK command or dynamic IDR at described with respect to FIG. 4. If the $DHPIDX_{DIFF}$ is found to be equal to $2^{(MAX\_FRAME\_LAYER-1)}$, the frame is decodable and process flow continues to block 518.

For example, when determining the decodability of the frame for a dyadic '2' hierarchy, the $DHPIDX_{DIFF}$ for base layer frames will be equal to $2^{\wedge}(2-1)=2$. Similarly for a dyadic '3' hierarchy, the $DHPIDX_{DIFF}$ is 4 and for a dyadic '4' hierarchy, the $DHPIDX_{DIFF}$ is '8.' This is equivalent to the GOP sizes for the base layer, as expected according to Table 2. At block 518, the new frame details are cached, to LAYER_INFO data structure at the $TID_N$ layer for the current frame N. In embodiments, the cached details may be used to determine if subsequent frames are decodable at block 514 and 524. At block 520, the frame is sent for further decode processes.

Returning to block 504, if it is determined that the $TID_N$ is a not base layer, process flow continues to block 508. At block 508, all layers cached in the LAYER_INFO data structure less than $TID_N$ are identified. At block 522, for the current lower layer of the identified lower layer frames at block 508 starting from the base layer, the $DHPIDX_{DIFF}$ is calculated. Thus, the $DHPIDX_{DIFF}$ of the present frame is calculated as $$DHPIDX_{DIFF} = DHPIDX_N - LAYER\_INFO[X] \cdot DHPIDX, \text{ where } X>=0 \text{ and } X<TID_N \qquad \text{Eqn. 3}$$

Thus, the decodable check for all higher layer frames uses the LAYER_INFO cached values for all the cached lower layers along with the information of current frame 'N' such as the temporal ID ($TID_N$) and the Dyadic Hierarchy Picture Index of the current frame ($DHPIDX_N$). At block 524, it is determined if the frame is decodable. The frame is decodable if the following equation is satisfied:

$$DHPIDX_{DIFF} = 2^{(MAX\_FRAME\_LAYER-1-TID_N)} \qquad \text{Eqn. 4}$$

where the MAX_FRAME_LAYER is the maximum number of layers supported. Here, if the $DHPIDX_{DIFF}$ is equivalent to two to the power of the maximum frame layer supported minus the temporal ID of the current frame, the frame is decodable. For example, for a layer 2 frame in a dyadic-4 hierarchy, if the $DHPIDX_{DIFF}$ is equal to $2(4-1-2)=2^1=2$, the frame is decodable as the frames are continuous with its reference frames in lower layers (such as layer 0 or 1).

The following summarizes the logic used to determine if the frame is decodable at block 508, 522 and 524:

```
X = 0                              // indicating base layer
While (X < TID_N) {                // Start from base layer and check lower layers
                                   (1- TID_N)
    DHPIDX_Diff = DHPIDXN - LAYER_INFO[X].DHPIDX  //
    DHPIDXdiff for 'X' layer frame
    If (DHPIDX_Diff == 2 ^ (MAX_FRAME_LAYER - 1 - TID_N))
        Frame is decodable     // Frame is decodable and can be sent to
    X ++                           // decoder Continue with next layer
}
```

In the above logic, X=0 is used to indicate the base layer. The process starts from the base layer and checks the continuity of lower layers (1-$TID_N$). The $DHPIDX_{Diff}$ with 'X' layer frame is obtained, and the continuity with 'X' layer frame is checked. The frame is decodable and can be sent to the decoder when it satisfies Equation 4 above. Process flow then continues to block 518. If the frame is not decodable, process flow continues to block 526. Process flow between block 508, 522, and 524 is performed iteratively for each cached layer as described at block 508. At block 526, retransmission is requested via a NACK command or dynamic IDR at described with respect to FIG. 4.

With the above logic, the frame dependency can be reconstructed thereby helping to identify if frames in any layer are decodable. In embodiments, the present techniques are interoperable they can use an optional RTP header extension. The benefits of the present techniques will be evident when both the transmitter and receiver have support including the DHPIDX. Otherwise, the present techniques may fall back to existing handling with the use of sequence numbers, marker bits and time stamps. Moreover, as a result of the present techniques, video rendering is smooth with reduced short freezes as a result of a higher number of decodable frames. Moreover, the network utilization has also been reduced (% dynamic IDR request have reduced significantly by 40% based on network conditions).

Figure 6:
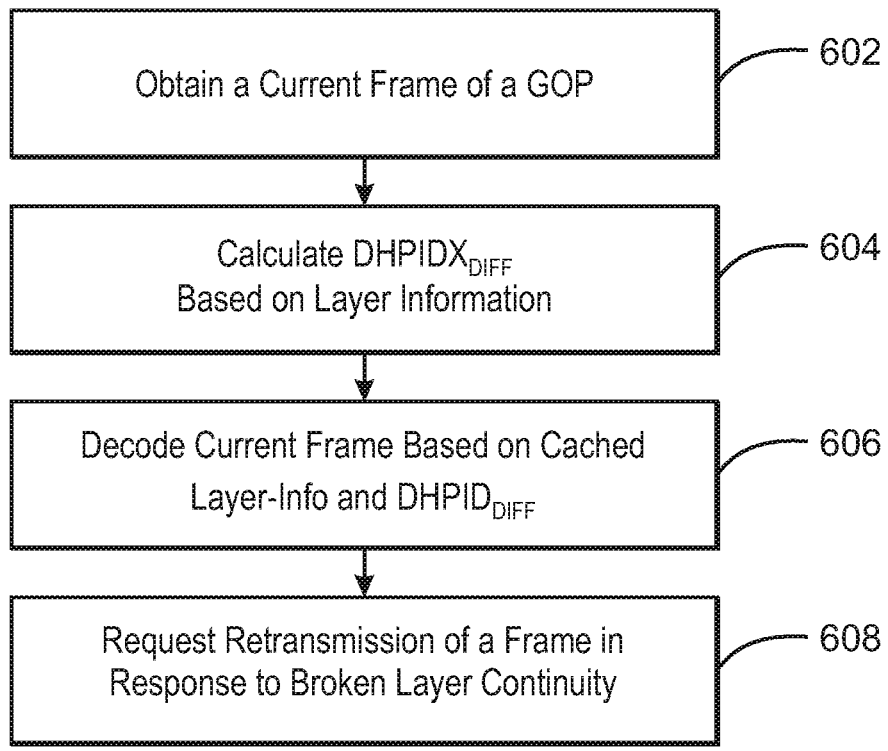
FIG. 6 is a process flow diagram of a method for efficient frame loss recovery and reconstruction (EFLRR) in dyadic hierarchy.

FIG. 6 is a process flow diagram of a method 600 for efficient frame loss recovery and reconstruction (EFLRR) in dyadic hierarchy. At block 602, a current frame of a GOP is obtained. At block 604, a $DHPIDX_{DIFF}$ is calculated based on layer information. At block 606, a current frame is decoded based on a determined layer continuity using the cached LAYER_INFO and the $DHPIDX_{DIFF}$. At block 608, in response to broken layer continuity, retransmission of a frame is requested.

The present techniques may be used to enable a good video conferencing experience by ensuring that the dependency of frames at receiver can be reliably reconstructed. In real world video conferencing, packet loss is inevitable due to varying network conditions. In such scenarios, only frames that are decodable (i.e. decoder has received all the previous frames it references) have to be sent for decode. Otherwise, the decoder stack cannot properly decode the frames, leading to unacceptable visual artifacts with poor user experience.

In embodiments, to avoid the visual artifacts, receiver determines the frame dependency and sends only decodable frames to the decoder. If the receiver cannot recover the frame dependency within a predetermined time period, using traditional techniques the receiver may request the sender to retransmit the key frame (i.e. dynamic IDR is requested using either RTCP FIR or PLI messages). This leads to significant overhead in terms of higher bandwidth utilization as key frame requires higher bit rate and also the delay in receiving the decodable frame leads to video freezes.

The present techniques explore the other potential benefit of temporal scalability that can be derived with the dyadic hierarchy structure on the receiver side. So even when few frames are lost, the present techniques can identify reliably whether or not a frame can be decoded by determining if the previous frames which it references has been properly received at the decoder, and can continue with decoding the current frame without requesting for new key frame. In an example, temporal scalability support can be enabled on AVC using prefix NALU (SVC header extension).

Figure 7:
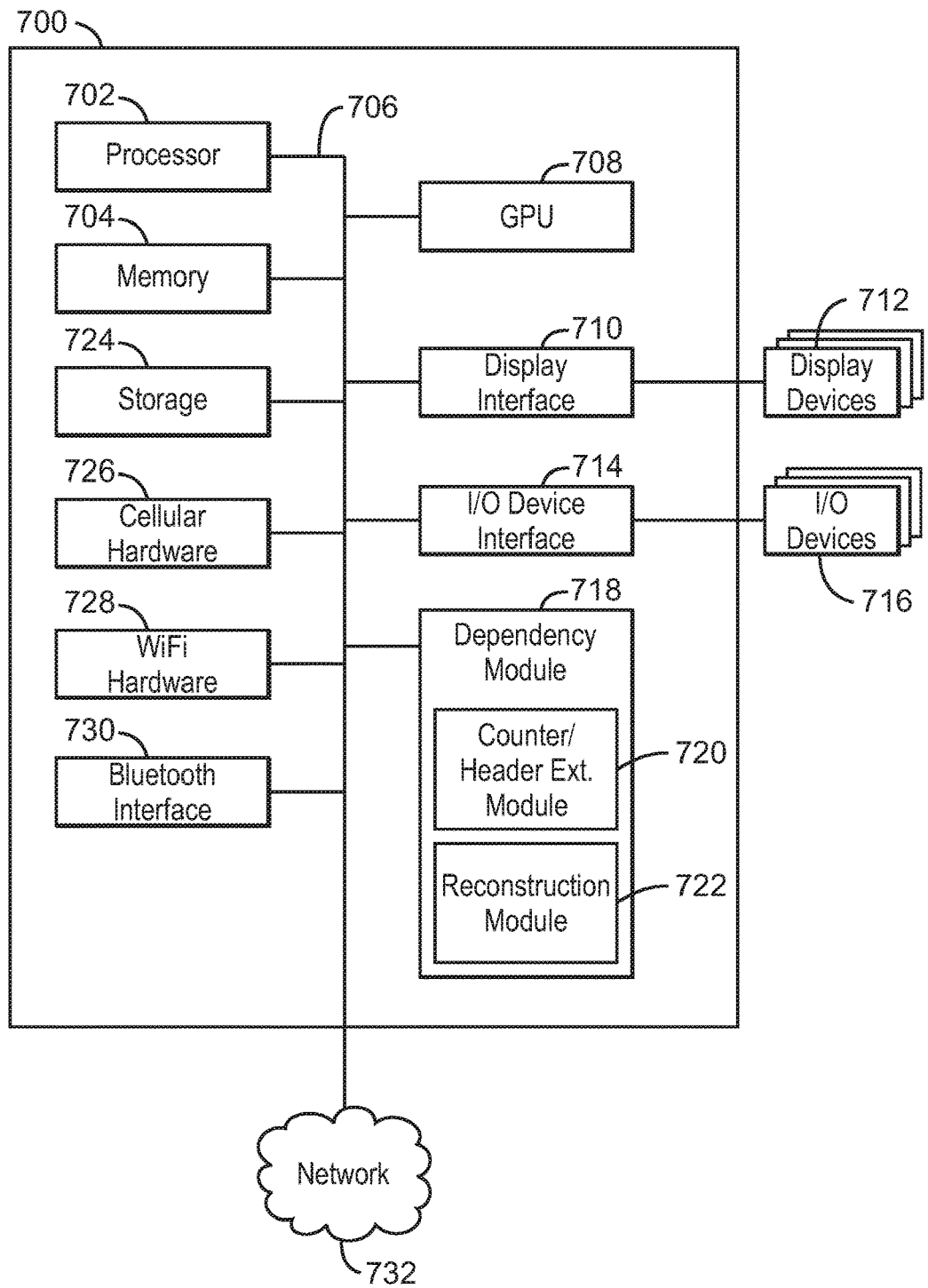
FIG. 7 is a block diagram of an exemplary system that enables efficient frame loss recovery and reconstruction (EFLRR) in dyadic hierarchy.

FIG. 7 is a block diagram of an exemplary system that enables efficient frame loss recovery and reconstruction (EFLRR) in dyadic hierarchy. The electronic device 700 may be, for example, a laptop computer, tablet computer, mobile phone, smart phone, or a wearable device, among others. The electronic device 700 may be used to receive and render media such as images and videos. The electronic device 700 may include a central processing unit (CPU) 702 that is configured to execute stored instructions, as well as a memory device 704 that stores instructions that are executable by the CPU 702. The CPU may be coupled to the memory device 704 by a bus 706. Additionally, the CPU 702 can be a single core processor, a multi-core processor, a computing cluster, or any number of other configurations. Furthermore, the electronic device 700 may include more than one CPU 702. The memory device 704 can include random access memory (RAM), read only memory (ROM), flash memory, or any other suitable memory systems. For example, the memory device 704 may include dynamic random access memory (DRAM).

The electronic device 700 also includes a graphics processing unit (GPU) 708. As shown, the CPU 702 can be coupled through the bus 706 to the GPU 708. The GPU 708 can be configured to perform any number of graphics operations within the electronic device 700. For example, the GPU 708 can be configured to render or manipulate graphics images, graphics frames, videos, streaming data, or the like, to be rendered or displayed to a user of the electronic device 700. In some embodiments, the GPU 708 includes a number of graphics engines, wherein each graphics engine is configured to perform specific graphics tasks, or to execute specific types of workloads.

The CPU 702 can be linked through the bus 706 to a display interface 710 configured to connect the electronic device 700 to one or more display devices 712. The display devices 712 can include a display screen that is a built-in component of the electronic device 700. In embodiments, the display interface 710 is coupled with the display devices 712 via any networking technology such as cellular hardware 726, Wi-Fi hardware 728, or Bluetooth Interface 730 across the network 732. The display devices 712 can also include a computer monitor, television, or projector, among others, that is externally connected to the electronic device 700.

The CPU 702 can also be connected through the bus 706 to an input/output (I/O) device interface 714 configured to connect the electronic device 700 to one or more I/O devices 716. The I/O devices 716 can include, for example, a keyboard and a pointing device, wherein the pointing device can include a touchpad or a touchscreen, among others. The I/O devices 716 can be built-in components of the electronic device 700, or can be devices that are externally connected to the electronic device 700. Accordingly, in embodiments, the I/O device interface 714 is coupled with the I/O devices 716 via any networking technology such as cellular hardware 726, Wi-Fi hardware 728, or Bluetooth Interface 730 across the network 732. The I/O devices 716 can also include any I/O device that is externally connected to the electronic device 700.

A dependency module 718 may be used to establish or decode frame dependencies based on layer continuity. The dependency module 718 may include a counter/header extension module 720 and a reconstruction module 722. The counter/header extension module 720 is determine a DHPIDX. As used herein, the DHPIDX may be a counter that is incremented for each encoded frame. The reconstruction module 722 may retrieve a Dyadic Hierarchy Picture Index (DHPIDX). The reconstruction module can reconstruct frames for all layers as described above.

The electronic device 700 may also include a storage device 724. The storage device 724 is a physical memory such as a hard drive, an optical drive, a flash drive, an array of drives, or any combinations thereof. The storage device 724 can store user data, such as audio files, video files, audio/video files, and picture files, among others. The storage device 724 can also store programming code such as device drivers, software applications, operating systems, and the like. The programming code stored to the storage device 724 may be executed by the CPU 702, GPU 708, or any other processors that may be included in the electronic device 700.

The CPU 702 may be linked through the bus 706 to cellular hardware 726. The cellular hardware 726 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 700 may access any network 732 without being tethered or paired to another device, where the cellular hardware 726 enables access to the network 732.

The CPU 702 may also be linked through the bus 706 to Wi-Fi hardware 728. The Wi-Fi hardware 728 is hardware according to Wi-Fi standards (standards promulgated as Institute of Electrical and Electronics Engineers' (IEEE) 802.11 standards). The Wi-Fi hardware 728 enables the electronic device 700 to connect to the Internet using the Transmission Control Protocol and the Internet Protocol (TCP/IP). Accordingly, the electronic device 700 can enable end-to-end connectivity with the Internet by addressing, routing, transmitting, and receiving data according to the TCP/IP protocol without the use of another device. Additionally, a Bluetooth Interface 730 may be coupled to the CPU 702 through the bus 706. The Bluetooth Interface 730 is an interface according to Bluetooth networks (based on the Bluetooth standard promulgated by the Bluetooth Special Interest Group). The Bluetooth Interface 730 enables the electronic device 700 to be paired with other Bluetooth enabled devices through a personal area network (PAN). Accordingly, the network 732 may be a PAN. Examples of Bluetooth enabled devices include a laptop computer, desktop computer, ultrabook, tablet computer, mobile device, or server, among others.

The block diagram of FIG. 7 is not intended to indicate that the electronic device 700 is to include all of the components shown in FIG. 7. Rather, the computing system 700 can include fewer or additional components not illustrated in FIG. 7 (e.g., sensors, power management integrated circuits, additional network interfaces, etc.). The electronic device 700 may include any number of additional components not shown in FIG. 7, depending on the details of the specific implementation. Furthermore, any of the functionalities of the CPU 702 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 8:
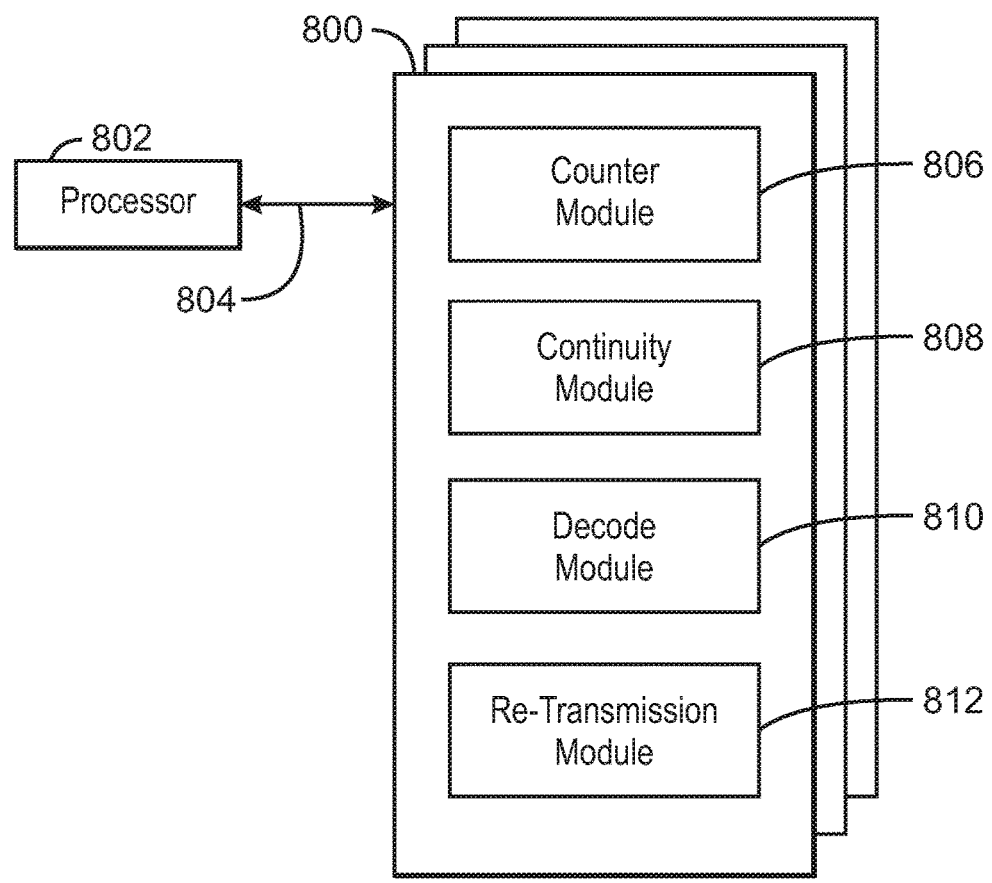
FIG. 8 is a block diagram showing a medium that contains logic for efficient frame loss recovery and reconstruction (EFLRR) in dyadic hierarchy.

FIG. 8 is a block diagram showing a medium 800 that contains logic for efficient frame loss recovery and reconstruction (EFLRR) in dyadic hierarchy. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The various software components discussed herein may be stored on the tangible, non-transitory computer-readable medium 800, as indicated in FIG. 8. The medium 800 may include modules 806-812 configured to perform the techniques described herein. For example, a counter module 806 may be configured to generate a DHPIDX. A continuity module 808 may be configured to determine continuity across a series of frames. A decode module 810 may be configured to decode frames based on the DHPIDX. Further, a retransmission module 812 may be configured to retransmit frames in the event that the frames cannot be decoded. A render module may send decoded frames to be rendered.

The block diagram of FIG. 8 is not intended to indicate that the tangible, non-transitory computer-readable medium 800 is to include all of the components shown in FIG. 8. Further, the tangible, non-transitory computer-readable medium 800 may include any number of additional components not shown in FIG. 8, depending on the details of the specific implementation.

Example 1 is a system. The system includes a display to render a plurality of frames; a memory that is to store instructions and that is communicatively coupled to the display; and a processor communicatively coupled to the display and the memory, wherein when the processor is to execute the instructions, the processor is to: obtain a current frame of a group of pictures; calculate a dyadic hierarchy picture index difference (DHPIDX$_{DIFF}$) for a current frame based on a layer information data structure in response to a prior frame missing in the group of pictures; and decode the current frame in response to a determined frame continuity based on the dyadic hierarchy picture Index difference.

Example 2 includes the system of example 1, including or excluding optional features. In this example, frame continuity indicates each frame used or referenced to code the current frame is available for referencing.

Example 3 includes the system of any one of examples 1 to 2, including or excluding optional features. In this example, the current frame is a base layer frame, and the frame continuity is determined by the Dyadic Hierarchy Picture Index difference being equal to two to the power of a maximum supported layer value minus one, where the index is incremented by 1.

Example 4 includes the system of any one of examples 1 to 3, including or excluding optional features. In this example, the current frame is a high level frame, and the frame continuity is determined by the Dyadic Hierarchy Picture Index difference being equal to two to the power of a maximum supported layer value minus a temporal layer identification (TID).

Example 5 includes the system of any one of examples 1 to 4, including or excluding optional features. In this example, in response to the current frame being an IDR frame, the layer information data structure is reset.

Example 6 includes the system of any one of examples 1 to 5, including or excluding optional features. In this example, in response to the current frame being not decodable, retransmission is requested.

Example 7 includes the system of any one of examples 1 to 6, including or excluding optional features. In this example, in response to no packet loss on in a network transmission the dyadic hierarchy picture index difference is not calculated and the current frame is decoded according to information stored in a packet header.

Example 8 includes the system of any one of examples 1 to 7, including or excluding optional features. In this example, a dyadic hierarchy picture index difference is maintained for each frame and used to determine decodability in response to a packet loss.

Example 9 includes the system of any one of examples 1 to 8, including or excluding optional features. In this example, a Dyadic Hierarchy Picture Index difference is maintained for each frame and is transmitted to a receiver in-band via a network transmission packet.

Example 10 includes the system of any one of examples 1 to 9, including or excluding optional features. In this example, temporal identification (TID) and Dyadic Hierarchy Picture Index (DHPIDX) are cached to generate a layer information data structure array of that is sized according to the maximum frames supported.

Example 11 is a method. The method includes obtaining a current frame of a group of pictures; calculating a dyadic hierarchy picture index difference (DHPIDXDIFF) for a current frame based on a layer information data structure in response to a prior frame missing in the group of pictures; decoding the current frame in response to a determined frame continuity based on the dyadic hierarchy picture index difference; and requesting re-transmission of a frame in response to a broken frame continuity.

Example 12 includes the method of example 11, including or excluding optional features. In this example, a frame continuity indicates each frame used to code the current frame is available for referencing.

Example 13 includes the method of any one of examples 11 to 12, including or excluding optional features. In this example, the current frame is a base layer frame, and the frame continuity is determined by the dyadic hierarchy picture index difference being equal to two to the power of a maximum supported layer value minus one.

Example 14 includes the method of any one of examples 11 to 13, including or excluding optional features. In this example, the current frame is a high level frame, and the frame continuity is determined by the dyadic hierarchy picture index difference being equal to two to the power of a maximum supported layer value minus a temporal layer identification (TID).

Example 15 includes the method of any one of examples 11 to 14, including or excluding optional features. In this example, in response to the current frame being an IDR frame, a data structure is reset.

Example 16 includes the method of any one of examples 11 to 15, including or excluding optional features. In this example, in response to the current frame being not decodable, retransmission is requested.

Example 17 includes the method of any one of examples 11 to 16, including or excluding optional features. In this example, in response to no packet loss on in a network transmission the dyadic hierarchy picture index difference is not calculated and the current frame is decoded according to information stored in a packet header.

Example 18 includes the method of any one of examples 11 to 17, including or excluding optional features. In this example, a dyadic hierarchy picture index difference is maintained for each frame and used to determine decodability in response to a packet loss.

Example 19 includes the method of any one of examples 11 to 18, including or excluding optional features. In this example, a dyadic hierarchy picture index difference is maintained for each frame and is transmitted to a receiver in-band via a network transmission packet.

Example 20 includes the method of any one of examples 11 to 19, including or excluding optional features. In this example, the DHPIDXDIFF indicates the maximum allowed index difference between two frames of the same layer.

Example 21 is an apparatus. The apparatus includes an image capture mechanism to obtain a current frame of a group of pictures; a counter to calculate a dyadic hierarchy picture index difference (DHPIDXDIFF) for a current frame based on a layer information data structure in response to a prior frame missing in the group of pictures; and a decoder to decode the current frame in response to a determined frame continuity based on the dyadic hierarchy picture index difference.

Example 22 includes the apparatus of example 21, including or excluding optional features. In this example, frame continuity indicates each frame referenced to code the current frame is available for referencing.

Example 23 includes the apparatus of any one of examples 21 to 22, including or excluding optional features. In this example, the current frame is a base layer frame, and the frame continuity is determined by the dyadic hierarchy picture index difference being equal to two to the power of a maximum supported layer value minus one.

Example 24 includes the apparatus of any one of examples 21 to 23, including or excluding optional features. In this example, the current frame is a high level frame, and the frame continuity is determined by the dyadic hierarchy picture index difference being equal to two to the power of a maximum supported layer value minus a temporal layer identification (TID).

Example 25 includes the apparatus of any one of examples 21 to 24, including or excluding optional features. In this example, in response to the current frame being an IDR frame, the layer information data structure is reset.

Example 26 includes the apparatus of any one of examples 21 to 25, including or excluding optional features. In this example, in response to the current frame being not decodable, retransmission is requested.

Example 27 includes the apparatus of any one of examples 21 to 26, including or excluding optional features.

In this example, in response to no packet loss on in a network transmission the dyadic hierarchy picture index difference is not calculated and the current frame is decoded according to information stored in a packet header.

Example 28 includes the apparatus of any one of examples 21 to 27, including or excluding optional features. In this example, a dyadic hierarchy picture index difference is maintained for each frame and used to determine decodability in response to a packet loss.

Example 29 includes the apparatus of any one of examples 21 to 28, including or excluding optional features. In this example, the dyadic hierarchy picture index difference is maintained for each frame and is transmitted to a receiver in-band via a network transmission packet.

Example 30 includes the apparatus of any one of examples 21 to 29, including or excluding optional features. In this example, temporal identification (TID) and dyadic hierarchy picture index (DHPIDX) are cached to generate a layer information data structure array of that is sized according to the maximum frames supported.

Example 31 is a non-transitory computer readable medium. The computer-readable medium includes instructions that direct the processor to obtaining a current frame of a group of pictures; calculating a dyadic hierarchy picture index difference (DHPIDXDIFF) for a current frame based on a layer information data structure in response to a prior frame missing in the group of pictures; decoding the current frame in response to a determined frame continuity based on the dyadic hierarchy picture index difference; and requesting re-transmission of a frame in response to a broken frame continuity.

Example 32 includes the computer-readable medium of example 31, including or excluding optional features. In this example, a frame continuity indicates each frame used to code the current frame is available for referencing.

Example 33 includes the computer-readable medium of any one of examples 31 to 32, including or excluding optional features. In this example, the current frame is a base layer frame, and the frame continuity is determined by the dyadic hierarchy picture index difference being equal to two to the power of a maximum supported layer value minus one.

Example 34 includes the computer-readable medium of any one of examples 31 to 33, including or excluding optional features. In this example, the current frame is a high level frame, and the frame continuity is determined by the dyadic hierarchy picture index difference being equal to two to the power of a maximum supported layer value minus a temporal layer identification (TID).

Example 35 includes the computer-readable medium of any one of examples 31 to 34, including or excluding optional features. In this example, in response to the current frame being an IDR frame, a data structure is reset.

Example 36 includes the computer-readable medium of any one of examples 31 to 35, including or excluding optional features. In this example, in response to the current frame being not decodable, retransmission is requested.

Example 37 includes the computer-readable medium of any one of examples 31 to 36, including or excluding optional features. In this example, in response to no packet loss on in a network transmission the dyadic hierarchy picture index difference is not calculated and the current frame is decoded according to information stored in a packet header.

Example 38 includes the computer-readable medium of any one of examples 31 to 37, including or excluding optional features. In this example, a dyadic hierarchy picture index difference is maintained for each frame and used to determine decodability in response to a packet loss.

Example 39 includes the computer-readable medium of any one of examples 31 to 38, including or excluding optional features. In this example, a dyadic hierarchy picture index difference is maintained for each frame and is transmitted to a receiver in-band via a network transmission packet.

Example 40 includes the computer-readable medium of any one of examples 31 to 39, including or excluding optional features. In this example, the DHPIDXDIFF indicates the maximum allowed index difference between two frames of the same layer.

Example 41 is an apparatus. The apparatus includes instructions that direct the processor to an image capture mechanism to obtain a current frame of a group of pictures; a means to calculate a dyadic hierarchy picture index difference (DHPIDXDIFF) for a current frame based on a layer information data structure in response to a prior frame missing in the group of pictures; and a decoder to decode the current frame in response to a determined frame continuity based on the dyadic hierarchy picture index difference.

Example 42 includes the apparatus of example 41, including or excluding optional features. In this example, frame continuity indicates each frame referenced to code the current frame is available for referencing.

Example 43 includes the apparatus of any one of examples 41 to 42, including or excluding optional features. In this example, the current frame is a base layer frame, and the frame continuity is determined by the dyadic hierarchy picture index difference being equal to two to the power of a maximum supported layer value minus one.

Example 44 includes the apparatus of any one of examples 41 to 43, including or excluding optional features. In this example, the current frame is a high level frame, and the frame continuity is determined by the dyadic hierarchy picture index difference being equal to two to the power of a maximum supported layer value minus a temporal layer identification (TID).

Example 45 includes the apparatus of any one of examples 41 to 44, including or excluding optional features. In this example, in response to the current frame being an IDR frame, the layer information data structure is reset.

Example 46 includes the apparatus of any one of examples 41 to 45, including or excluding optional features. In this example, in response to the current frame being not decodable, retransmission is requested.

Example 47 includes the apparatus of any one of examples 41 to 46, including or excluding optional features. In this example, in response to no packet loss on in a network transmission the dyadic hierarchy picture index difference is not calculated and the current frame is decoded according to information stored in a packet header.

Example 48 includes the apparatus of any one of examples 41 to 47, including or excluding optional features. In this example, a dyadic hierarchy picture index difference is maintained for each frame and used to determine decodability in response to a packet loss.

Example 49 includes the apparatus of any one of examples 41 to 48, including or excluding optional features. In this example, the dyadic hierarchy picture index difference is maintained for each frame and is transmitted to a receiver in-band via a network transmission packet.

Example 50 includes the apparatus of any one of examples 41 to 49, including or excluding optional features. In this example, temporal identification (TID) and dyadic hierarchy picture index (DHPIDX) are cached to generate a layer information data structure array of that is sized according to the maximum frames supported.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
a display to render a plurality of frames;
a memory that is to store instructions and that is communicatively coupled to the display; and
a processor communicatively coupled to the display and the memory, wherein when the processor is to execute the instructions, the processor is configured to:
obtain a current frame of a group of pictures;
calculate a dyadic hierarchy picture index difference ($DHPIDX_{DIFF}$) for a current frame based on a base layer and an enhancement layer information data structure in response to a prior frame missing in the group of pictures; and
decode the current frame in response to a determined frame continuity based on the dyadic hierarchy picture Index difference.

2. The system of claim 1, wherein frame continuity indicates each frame used or referenced to code the current frame is available for referencing.

3. The system of claim 1, where the current frame is a base layer frame, and the frame continuity is determined by the Dyadic Hierarchy Picture Index difference being equal to two to the power of a maximum supported layer value minus one.

4. The system of claim 1, where the current frame is a high level frame, and the frame continuity is determined by the Dyadic Hierarchy Picture Index difference being equal to two to the power of a maximum supported layer value minus a temporal layer identification (TID).

5. The system of claim 1, wherein in response to the current frame being an Instantaneous Decoding Refresh (IDR) frame, the layer information data structure is reset.

6. The system of claim 1, wherein in response to the current frame being not decodable, retransmission is requested.

7. The system of claim 1, wherein in response to no packet loss in a network transmission the dyadic hierarchy picture index difference is not calculated and the current frame is decoded according to information stored in a packet header.

8. The system of claim 1, wherein a dyadic hierarchy picture index difference is maintained for each frame and used to determine decodability in response to a packet loss.

9. The system of claim 1, wherein a Dyadic Hierarchy Picture Index difference is maintained for each frame and is transmitted to a receiver in-band via a network transmission packet.

10. The system of claim 1, wherein a temporal identification (TID) and Dyadic Hierarchy Picture Index (DH-PIDX) are cached to generate a layer information data structure array of that is sized according to the maximum frames supported.

11. A method, comprising:
   obtaining a current frame of a group of pictures;
   calculating a dyadic hierarchy picture index difference ($DHPIDX_{DIFF}$) for a current frame based on a base layer and an enhancement layer information data structure in response to a prior frame missing in the group of pictures;
   decoding the current frame in response to a determined frame continuity based on the dyadic hierarchy picture index difference; and
   requesting re-transmission of a frame in response to a broken frame continuity.

12. The method of claim 11, wherein a frame continuity indicates each frame used to code the current frame is available for referencing.

13. The method of claim 11, where the current frame is a base layer frame, and the frame continuity is determined by the dyadic hierarchy picture index difference being equal to two to the power of a maximum supported layer value minus one.

14. The method of claim 11, where the current frame is a high level frame, and the frame continuity is determined by the dyadic hierarchy picture index difference being equal to two to the power of a maximum supported layer value minus a temporal layer identification (TID).

15. The method of claim 11, wherein in response to the current frame being an IDR frame, a data structure is reset.

16. The method of claim 11, wherein in response to the current frame being not decodable, retransmission is requested.

17. The method of claim 11, wherein in response to no packet loss on in a network transmission the dyadic hierarchy picture index difference is not calculated and the current frame is decoded according to information stored in a packet header.

18. An apparatus, comprising:
   an image capture mechanism to obtain a current frame of a group of pictures;
      a counter to calculate a dyadic hierarchy picture index difference ($DHPIDX_{DIFF}$) for a current frame based on a base layer and an enhancement layer information data structure in response to a prior frame missing in the group of pictures; and
   a decoder to decode the current frame in response to a determined frame continuity based on the dyadic hierarchy picture index difference.

19. The apparatus of claim 18, wherein frame continuity indicates each frame referenced to code the current frame is available for referencing.

20. The apparatus of claim 18, where the current frame is a base layer frame, and the frame continuity is determined by the dyadic hierarchy picture index difference being equal to two to the power of a maximum supported layer value minus one.

21. The apparatus of claim 18, where the current frame is a high level frame, and the frame continuity is determined by the dyadic hierarchy picture index difference being equal to two to the power of a maximum supported layer value minus a temporal layer identification (TID).

22. The apparatus of claim 18, wherein in response to the current frame being an IDR frame, the layer information data structure is reset.

23. The apparatus of claim 18, wherein in response to the current frame being not decodable, retransmission is requested.

24. The apparatus of claim 18, wherein in response to no packet loss on in a network transmission the dyadic hierarchy picture index difference is not calculated and the current frame is decoded according to information stored in a packet header.

25. The apparatus of claim 18, wherein a dyadic hierarchy picture index difference is maintained for each frame and used to determine decodability in response to a packet loss.

* * * * *